(12) United States Patent
Werner et al.

(10) Patent No.: US 10,432,135 B2
(45) Date of Patent: Oct. 1, 2019

(54) SOLAR ROOF TILE SYSTEM

(71) Applicant: Sigma Energy Systems GmbH, Philippsburg (DE)

(72) Inventors: Eberhard Werner, Schemmerhofen (DE); Agathe Schmidt, Graben-Neudorf (DE); Josef Schmidt, Graben-Neudorf (DE)

(73) Assignee: Sigma Energy Systems GmbH, Philippsburg (DE)

( * ) Notice: Subject to any disclaimer, the term of this patent is extended or adjusted under 35 U.S.C. 154(b) by 0 days.

(21) Appl. No.: 15/543,980

(22) PCT Filed: Jan. 15, 2016

(86) PCT No.: PCT/DE2016/100020
§ 371 (c)(1),
(2) Date: Jul. 14, 2017

(87) PCT Pub. No.: WO2016/112899
PCT Pub. Date: Jul. 21, 2016

(65) Prior Publication Data
US 2018/0054155 A1    Feb. 22, 2018

(30) Foreign Application Priority Data
Jan. 16, 2015   (DE) .................... 20 2015 000 200 U

(51) Int. Cl.
*H02S 20/25* (2014.01)
*H02S 40/34* (2014.01)
*H02S 40/36* (2014.01)
*F24S 25/40* (2018.01)
*F24S 25/30* (2018.01)
*F24S 25/632* (2018.01)

(52) U.S. Cl.
CPC .............. *H02S 20/25* (2014.12); *F24S 25/30* (2018.05); *F24S 25/40* (2018.05); *F24S 25/632* (2018.05); *H02S 40/34* (2014.12); *H02S 40/36* (2014.12); *Y02B 10/12* (2013.01); *Y02B 10/20* (2013.01); *Y02E 10/47* (2013.01)

(58) Field of Classification Search
CPC .......... H02S 20/25; H02S 40/34; H02S 40/36; F24S 25/40; F24S 25/632; H02J 3/383
See application file for complete search history.

(56) References Cited

U.S. PATENT DOCUMENTS

| 2007/0054158 A1* | 3/2007 | Ovshinsky | ............ H01M 4/242 |
| | | | 429/9 |
| 2009/0064606 A1* | 3/2009 | Ceria | ...................... E04D 3/352 |
| | | | 52/173.3 |

(Continued)

*Primary Examiner* — Paola Agudelo
(74) *Attorney, Agent, or Firm* — Damian Wasserbauer, Esq.; Wasserbauer Law LLC

(57) ABSTRACT

The invention relates to a solar roof plate system for laying on an inclined surface, preferably on a roof comprising a roof ridge and an eave, with at least two roof plates comprising an upper side and a lower side, and with a solar module, which extends over the upper side of the roof plates and can be fastened thereto. A profile rail is provided interconnecting the roof plates, which comprises at least one module receptacle for receiving an edge of the solar module, preferably an edge of the solar module facing the eaves or the roof ridge.

15 Claims, 9 Drawing Sheets

(56) References Cited

U.S. PATENT DOCUMENTS

| | | | | |
|---|---|---|---|---|
| 2010/0313499 A1* | 12/2010 | Gangemi | ................ | H02S 20/25 |
| | | | | 52/173.3 |
| 2012/0024563 A1* | 2/2012 | Korman | ................... | H02S 40/32 |
| | | | | 174/51 |
| 2012/0255596 A1* | 10/2012 | Korman | .............. | H01L 31/0424 |
| | | | | 136/251 |
| 2014/0069482 A1* | 3/2014 | Hong | .................. | H01L 31/0483 |
| | | | | 136/246 |
| 2015/0089887 A1* | 4/2015 | Bellavia | .................... | E04D 1/20 |
| | | | | 52/173.3 |
| 2015/0101653 A1* | 4/2015 | Cioffi | ...................... | H02S 20/00 |
| | | | | 136/251 |
| 2015/0326172 A1* | 11/2015 | Koehler | ................ | F24J 2/5228 |
| | | | | 52/24 |
| 2017/0005610 A1* | 1/2017 | Sabban | ................... | H02S 20/23 |
| 2017/0302221 A1* | 10/2017 | Jasmin | .................... | H02S 20/23 |
| 2018/0226918 A1* | 8/2018 | De Vogel | ................ | H02S 40/30 |

\* cited by examiner

100

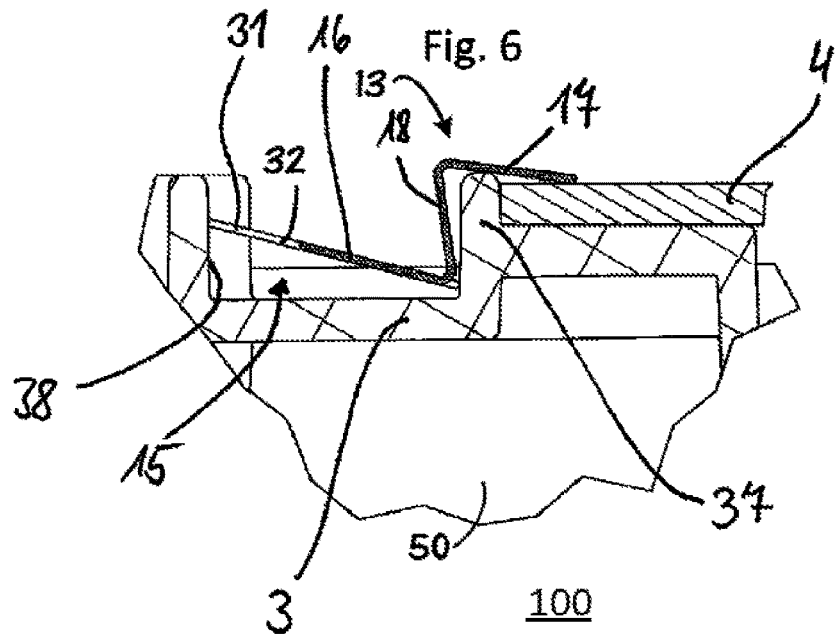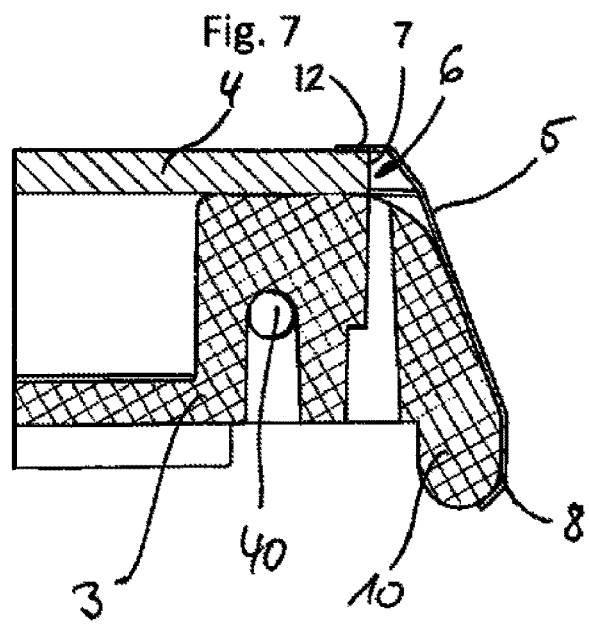

SOLAR ROOF TILE SYSTEM

CROSS-REFERENCE TO RELATED APPLICATIONS

This application claims priority and is the National Stage of International Application No. PCT/DE2016/100020, filed Jan. 15, 2016, which claims priority to German Application No. DE 20 2015 000 200.5 filed Jan. 16, 2015, the content of the above applications are incorporated by reference in their entirety.

FIELD OF THE INVENTION

The invention relates to a solar roof plate system for installation on an inclined surface, preferably on a roof comprising a roof ridge and an eave, with at least two roof plates comprising an upper side and a lower side, and with a solar module, which extends over the upper sides of the roof plates and can be fastened thereto. The invention also relates to a profile rail and a roof plate for use with a solar roof plate system.

BACKGROUND OF THE INVENTION

Such systems are sufficiently known in practice, wherein beams (transverse beams and longitudinal beams) are mounted on regular roof plates, saddle stones or roof tiles. The solar modules are then fastened to these beams. The beams additionally build up the roof with the modules and due to screw connections leaks can occur on the roof, which subsequently require an increased sealing effort.

SUMMARY OF THE INVENTION

It is an object of the present invention to provide an apparatus, system and method of It is therefore the object of the invention to provide a solar roof plate an apparatus, system and method for a profile rail and a roof plate for use with a solar roof plate system of the initially mentioned type, which overcome the disadvantages mentioned above This object is solved in a solar roof plate system of the initially mentioned type by providing a profile rail interconnecting the roof plates, which comprises at least one of a module receptacle for receiving an edge of the solar module, preferably an edge of the solar module facing the eaves or the roof ridge.

The use of a profile rail ensures on the one hand that it connects the roof plates firmly to one another, whereby a strong substructure is created for the support of a solar module. On the other hand, the solar module is reliably secured by means of the profile rail to the roof plates, i.e. to the main bodies or saddle stones. The profile rail thus serves as a multifunctional component, which additionally provides the system with a rigid edge on the side of the solar roof plate system facing the roof ridge or the eave.

It is particularly advantageous that the solar roof plate system can be formed as a roof-integrated system. Furthermore, the system is free of adhesives and mobile so that material stresses are substantially reduced or even completely avoided. Furthermore by using the profile rail the solar roof plate system meets the requirements of the standard for the performance of roofs to external fire exposure (EN 1187/flying sparks protection test).

In order to be able to connect the roof plates securely to one another, it has proved to be preferred if the profile rail has at least one of a roof plate receptacle for receiving at least one of the roof plates.

For this purpose, it is expedient if the at least one roof plate receptacle is formed as a profile clamp, and if the roof plates have a clamp section, which can be gripped by the profile clamp. As a result, the mounting of the solar roof plate system is greatly simplified since the profile rail can simply be inserted like a clip, or like a spring clamp.

In order to simplify the mounting of the solar module or an edge of the solar module on the module receptacle, it has proved to be expedient if the module receptacle is formed by a support section and a bracket section. For material saving, it is advantageous if the support section of the at least one module receptacle is formed in one piece with the profile clamp and thus in one piece with the roof plate receptacle.

The stiffness of the solar roof plate system is additionally increased if a number of roof plate receptacles is provided corresponding to the number of roof plates.

It is furthermore advantageous if at least one of a clamp is provided for securing an edge of the solar module spaced apart from the profile rail to at least one of the roof plates. As a result, the solar module is additionally secured to the roof plates.

In order to be able to in turn establish a fixed connection between the clamp and the roof plate, it has been found to be preferred if at least one of a clamp receptacle is arranged on the upper side of at least one of the roof plates for securing the at least one clamp to one of the roof plates.

A further preferred embodiment provides that the clamp comprises a roof plate section secured in the clamp receptacle and a module section, which interacts with the solar module. The clamp may be formed of a spring steel, preferably of a resilient stainless steel. The module section secures the solar module under spring preload on the roof plate. In order to facilitate the assembly, it has proved to be expedient if the roof plate section of the clamp is secured in the clamp receptacle by means of a press connection.

In order to be able to produce the clamp in a simple manner, for example in a bending stamping process, it is advantageous if the clamp is formed in cross section in a z-shape or in steps having a wall connecting the roof plate section and the module section.

It has been shown to be preferred if at least one of the roof plates has at least one of a guide member on its area not covered by the solar module. This ensures that the solar roof plate systems are aligned to one another in a corresponding manner and that no solar roof plate system covers the solar cells of the other.

Here, it is of advantage if the roof plates or saddle stones have on their lower side at least one of a guide receptacle for receiving the guide member of the next lower-lying roof plate.

The object regarding the profile rail is solved by a profile rail with the features is intended for a solar roof plate system for connecting at least two of the roof plates. It comprises a module receptacle formed by a bracket section and a support section for receiving an edge of a solar module and at least one roof plate receptacle, which is formed as a profile clamp with a plurality of folds. Preferably, the profile rail is made of a rustproof or of a corrosion-resistant material (such as plastic), preferably a resilient stainless steel. The object regarding the roof plate is solved according to the present invention with a roof plate.

BRIEF DESCRIPTION OF THE DRAWINGS

The invention is explained in detail below with reference to an exemplary embodiment depicted in the drawings; which show non-limiting and non-exhaustive embodiments of the present invention described with reference to the following drawings where like reference numerals refer to like parts throughout the various figures unless otherwise specified:

FIG. 6 illustrates the roof plate system, taken along the detail A-A of FIG. 4;

FIG. 7 illustrates the roof plate system, taken along the section VII-VII of FIG. 1;

DESCRIPTION OF THE EMBODIMENTS

Figure 1:
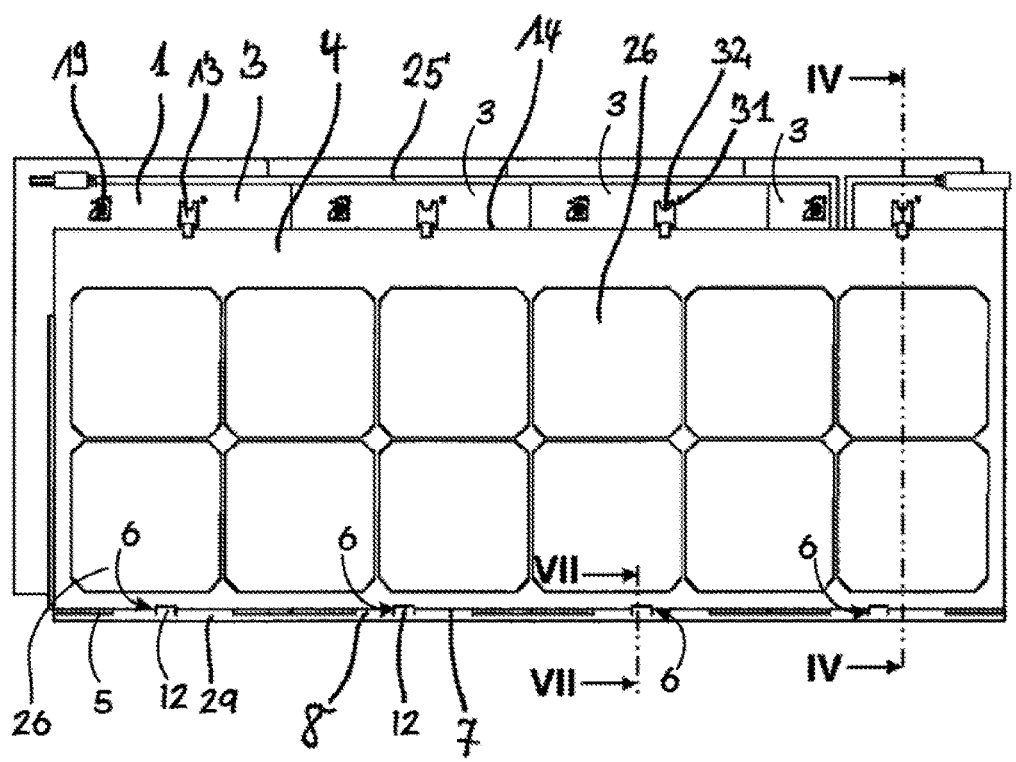
FIG. 1 illustrates a plane view of a solar roof plate system.

Non-limiting embodiments of the present invention will be described below with reference to the accompanying drawings, wherein like reference numerals represent like elements throughout. While the invention has been described in detail with respect to the preferred embodiments thereof, it will be appreciated that upon reading and understanding of the foregoing, certain variations to the preferred embodiments will become apparent, which variations are nonetheless within the spirit and scope of the invention.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "some embodiments", "one embodiment", "certain embodiments", and "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

The drawings featured in the figures are provided for the purposes of illustrating some embodiments of the present invention, and are not to be considered as limitation thereto. Term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein and use of the term "means" is not intended to be limiting.

In FIGS. 1 to 4 and 6-10, a solar roof plate system 100 is displayed for laying on an inclined surface 50, such as a rafter or a roof structure, preferably on a roof comprising a roof ridge and an eave, a base body or roof plate 3 comprising an upper side 1 and a lower side 2, and with a solar module 4, which extends over the upper side 1 of the roof plates 3 and can be fastened thereto for with at least two roof plates 3 being uses with the solar roof plate system 100 as illustrated in FIG. 1.

For connecting the roof plates 3, as shown in FIGS. 1-4, 5a, and 7, a profile rail 5 is provided, which comprises a module receptacle 6 for receiving an edge 7 of the solar module 4 facing the eave of the roof. In the displayed exemplary embodiment, interconnecting the base body of four of the roof plates 3 are provided for installing the elongated solar panel 4, as shown in FIGS. 1-3, 8 and 9, which are interconnected by the profile rail 5. Of course, more or less than four roof plates 3 can also be used in a solar roof plate system 100 according to the invention.

Figure 2:
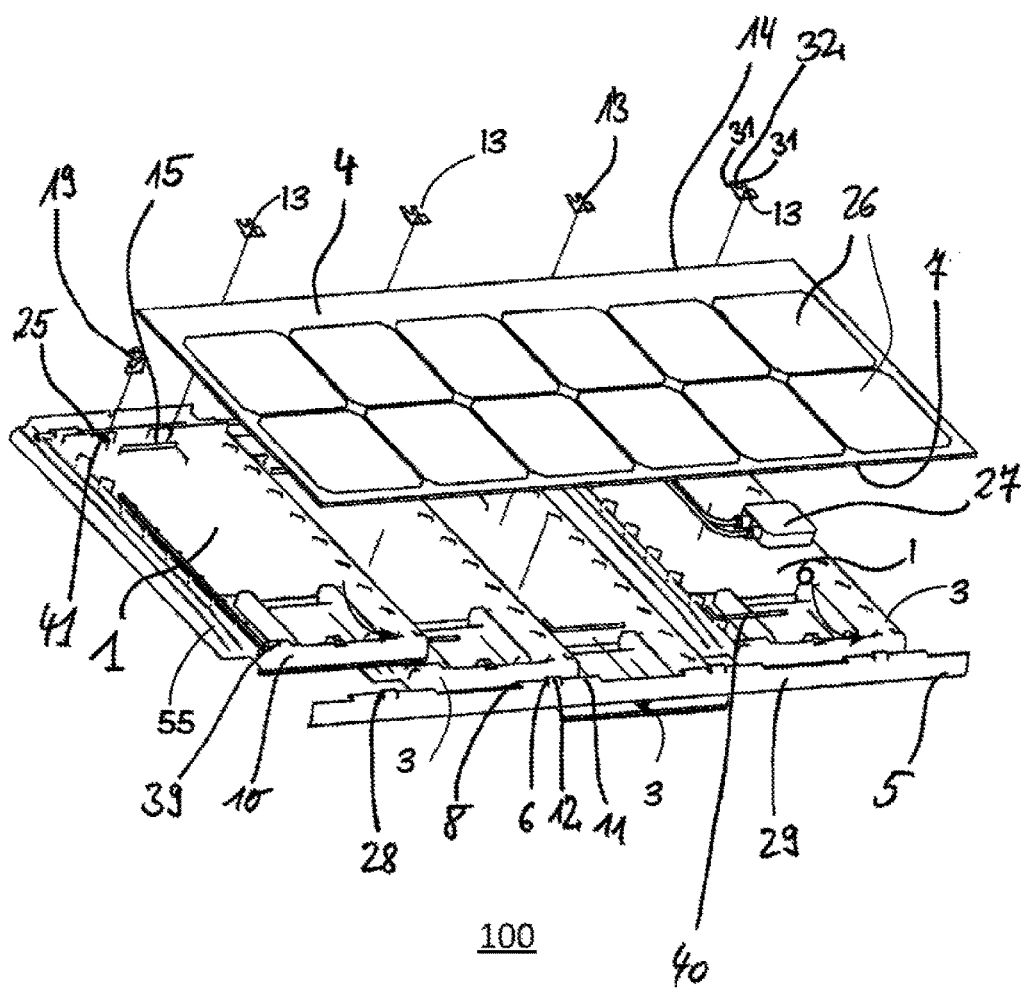
FIG. 2 illustrates an exploded view of the system according to FIG. 1.
Figure 3:
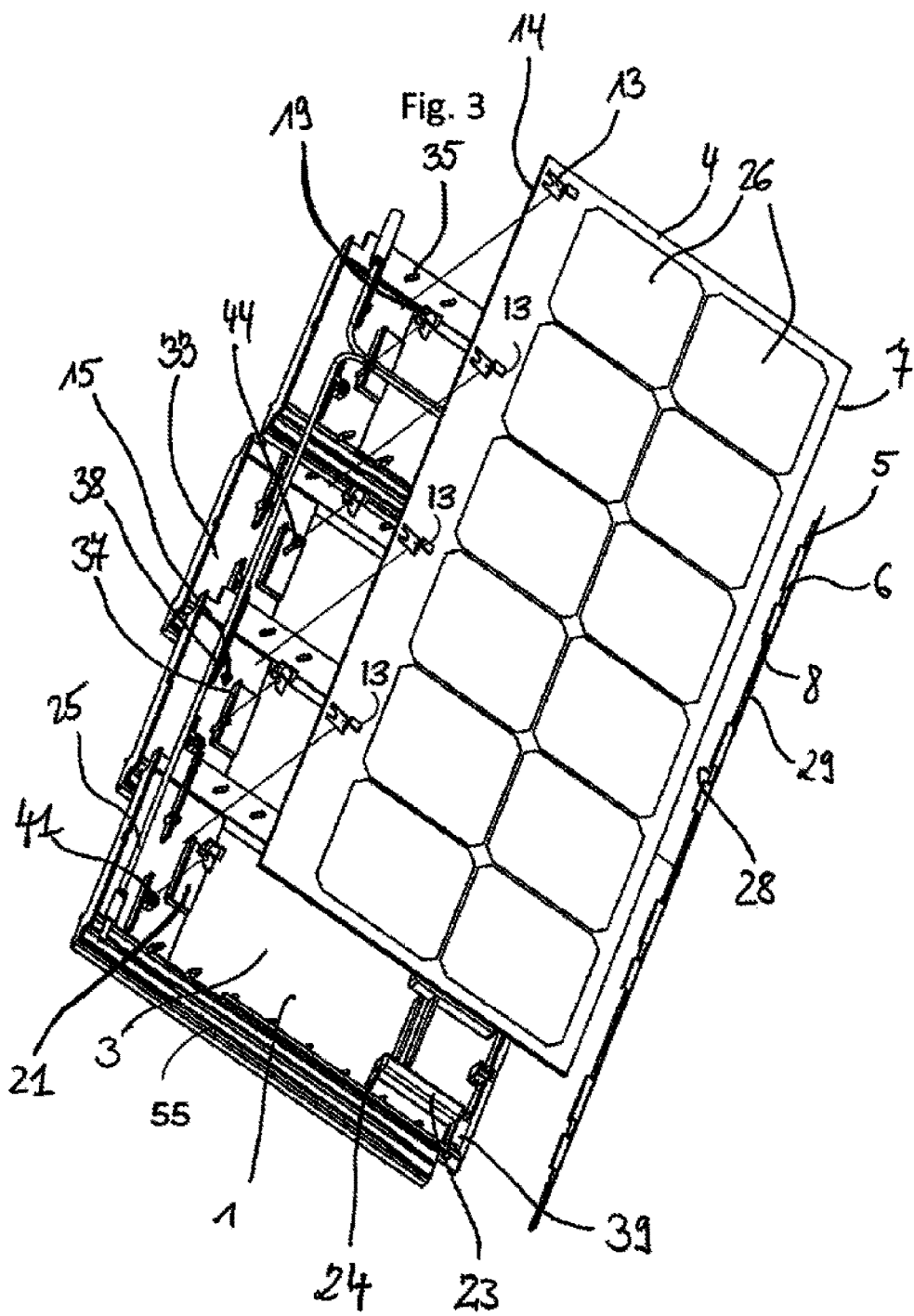
FIG. 3 illustrates a further exploded view of the system according to FIG. 1.

Furthermore, at least one clamp 13, and as shown in FIGS. 1-3 a plurality of clamps 13 are shown in the displayed exemplary embodiment with a total of four, which secure the solar module 4 on its side spaced apart from the profile rail 5 (upper edge 14 of solar module 4 facing the roof ridge) on the roof plates 3. Furthermore, connecting cables 25 are shown, which form one or more electrical connections to solar modules 4 of adjacent solar roof plate systems 100 or to electrical storage devices. The solar module 4 has a plurality of solar cells 26, as shown in FIGS. 1-3 and 10, and is otherwise formed in a manner known to a person skilled in the art.

The roof plates 3 of the solar roof plate system 100, as shown in FIGS. 1-4, and 10, according to the invention are formed in such a way that the entire solar roof plate system 100—if a solar module 4 is already fastened—forms a planar roof structure with the other (not covered) roof tiles or saddle stones or roof plates, in which the solar module 4 or modules 4 do not project beyond a flat base surface. In other words, the other roof tiles/saddle stones form a flat surface with the solar module 4 of the solar roof plate system 100, thus creating a roof-integrated system.

Figure 4:
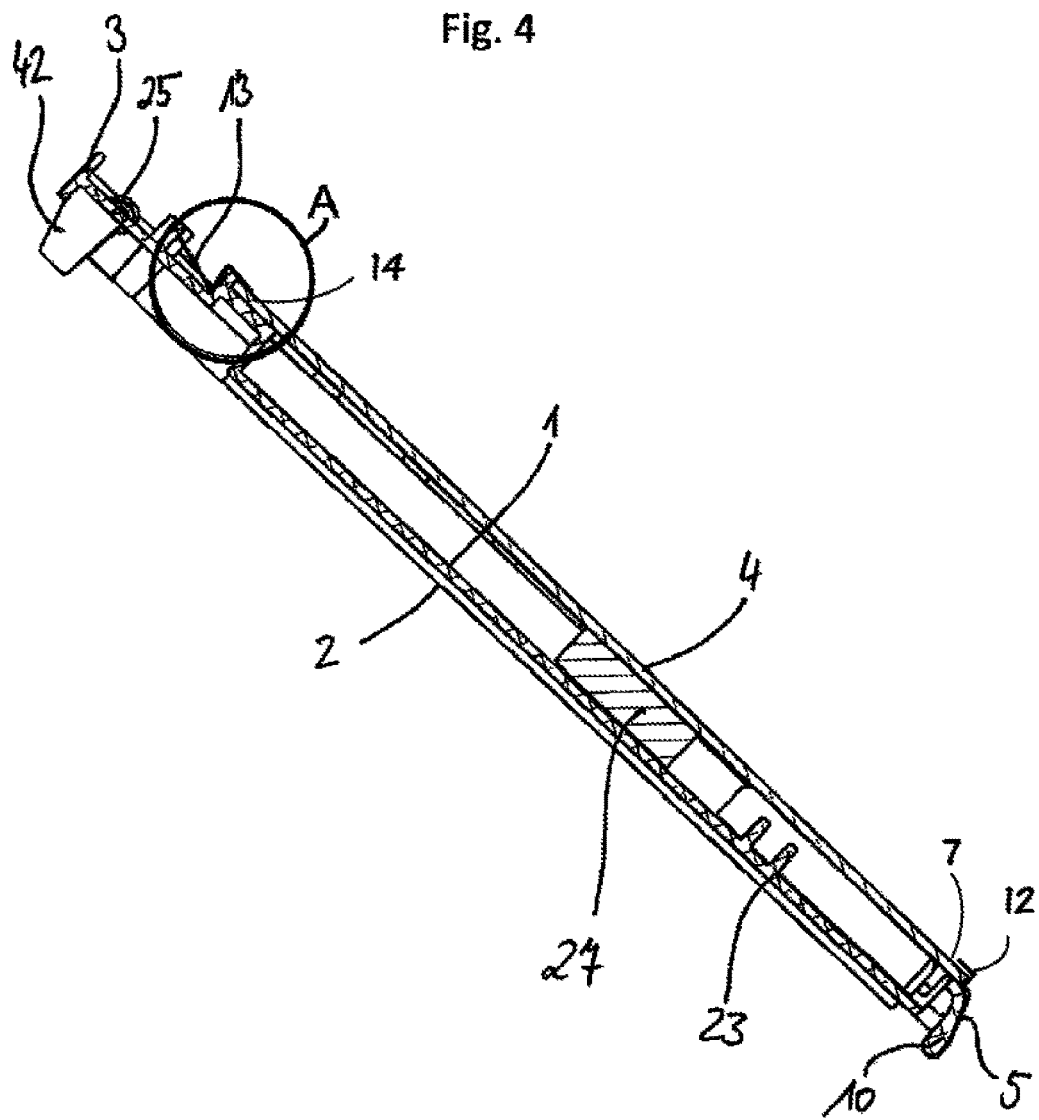
FIG. 4 illustrates the roof plate system, taken along the section lines IV-IV of FIG. 1.

FIGS. 2 and 4, shows that a connection block 27 is assigned to the solar module 4, to which the connecting cables 25 are connected. This connection block 27 is located on the upper side 1 of the roof plates 3, so that no separate penetration has to be provided for the connecting cables 25 through the roof plate 3 itself, as shown in FIGS. 1-4. Furthermore, for the solar roof plate system 100 no penetration of the roofing or of the insulation of the roof is necessary, so that the system is particularly tight with respect to impinging liquid.

Figure 5A:
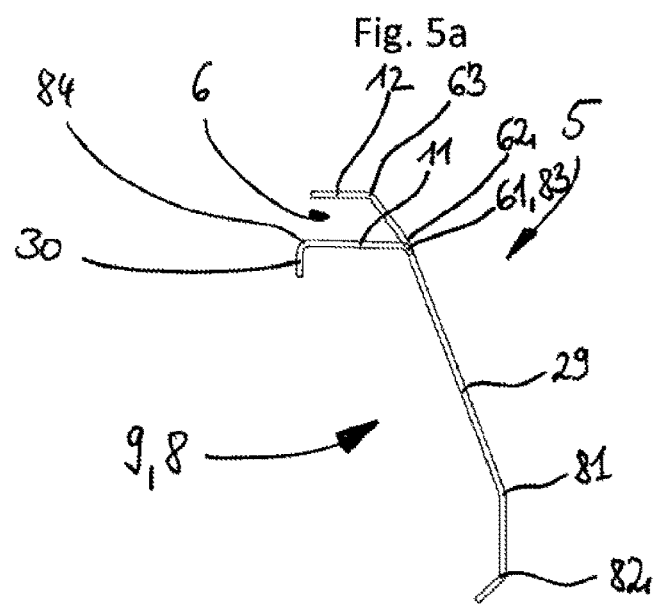
FIGS. 5a and 5b illustrates side and top views, respectfully, of the profile rail.
Figure 5B:
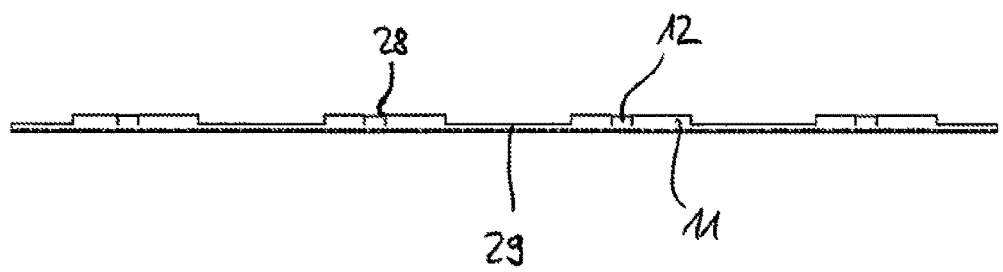

In the following FIGS. 1-4, 5a-5a, 7 and 10, the structure of a profile rail or profiled strip 5 according to the invention will be explained in more detail with reference to FIGS. 5a and 5b. In the side view illustrated in FIG. 5a, the profile rail 5 is provided with a module receptacle 6, which is formed by a bracket section 12 and a support section 11, shown operably connected to the solar module 4 in FIGS. 1 and 7. In the present exemplary embodiment of FIG. 1, four of the module receptacles 6 are arranged on the profile rail 5, wherein a different number of module receptacles 6, for example, three or even five module receptacles 6 are possible. The profile rail 5 is formed from a bent sheet metal, wherein the module receptacle 6 is designed in such a way that the support section 11 is arranged on the left and right side of the bracket section 12 as shown in FIG. 5a. In the region of the bracket section 12, the support section 11 thus exhibits a recess 28 for material saving of the sheet metal, as shown in FIG. 5b. From the material of this recess 28, the bracket portion 12 is preferably formed. The profile rail 5 also has a base strut 29, as shown in FIG. 5b, which extends along the complete profile rail 5 and which gives the profile rail 5 additional stability. The module receptacle 6 is adjacent and adjoins this base strut 29 on the side (i.e., left side shown in FIG. 5a) facing the solar module 4, wherein adjacent the support section 11 connecting to the base strut 29, the profile rail 5 has, a first profile clamp fold 61 of between a range of about 60 degrees and 80 degrees, preferably of exactly 67.5 degrees, so as to receive the solar module 4 substantially parallel on the support section 11 relative to the base strut 29, as shown in FIGS. 6 and 7. The upwardly extending bracket section 12 has a second profile clamp fold 62 of between a range of about 10 degrees to 20 degrees, preferably exactly 16 degrees, relative to the base strut 29. Furthermore, the bracket section 12 comprises a further third profile clamp fold 63 of between a range of about 45 degrees to 60 degrees, preferably exactly 53 degrees, the bracket section 12 substantially parallel to the spaced apart adjacent support section 11 so as to receive the solar module 4 the bracket section 6 thereby.

Figure 10:
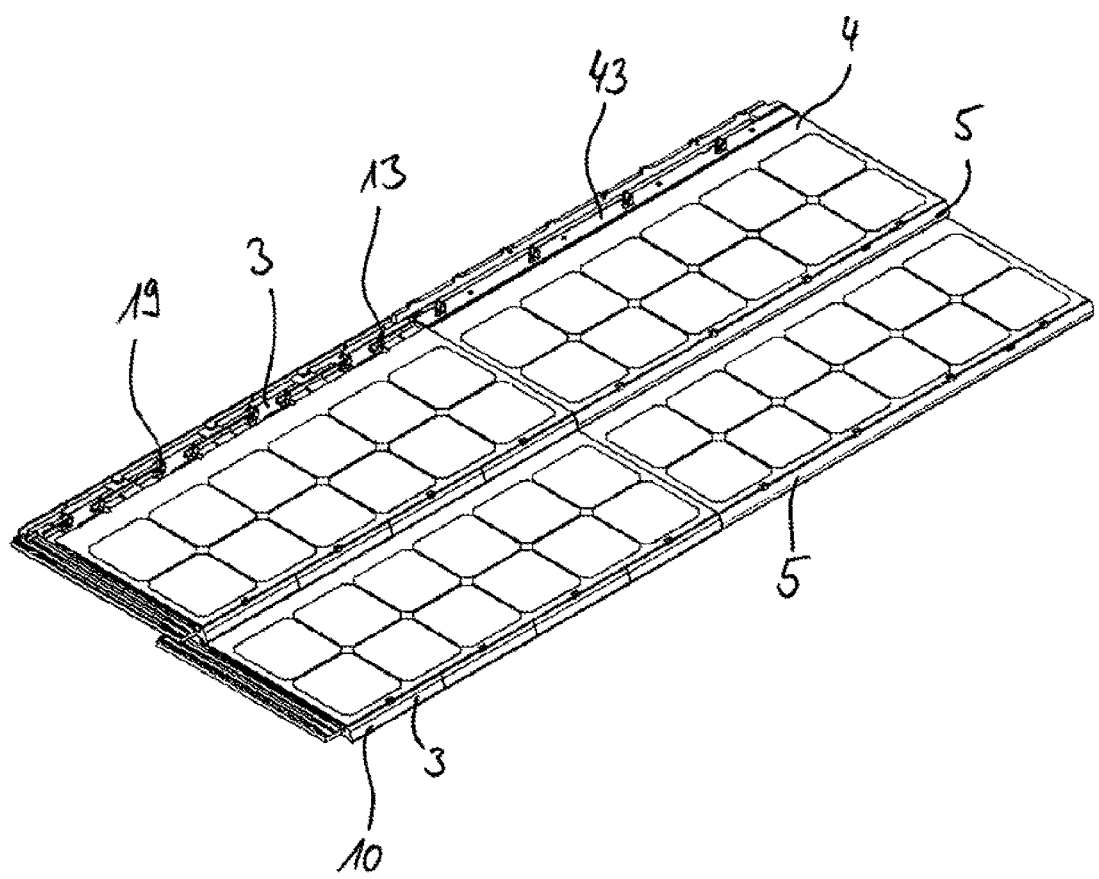
FIG. 10 an arrangement of several solar roof plate systems.

As illustrated in FIGS. 5a and 7, it can also be seen that a roof plate receptacle 8 is formed as a profile clamp 9, which can encompass a clamping section 10 of the roof plate 3 as shown in FIG. 7. The roof plate receptacle 8 is formed with a plurality of folds, wherein a first receptacle fold 81 is arranged on the side of the base strut 29 adjacent the support section 11 on a surface spaced apart from the solar module 4, which is bent by an angle between a range of about 18 degrees and 25 degrees, preferably by exactly 21 degrees, as shown in FIGS. 6 and 7. This first receptacle fold 81 is adjoined by a further second receptacle fold 82, which is bent by an angle of a range of about 40 degrees to 60 degrees, preferably by exactly 47 degrees. On the side of the base strut 29 facing the solar module 4 a third receptacle fold 83 is provided, which is folded between a range of about 60 degrees and 80 degrees, preferably by exactly 67.5 degrees. Furthermore, a securing section 30 that may be configured in the form of a further edge fold 84 adjoins the end of the support section 11, as shown in FIG. 5a, which serves for engaging behind the clamp sections 10 of the roof plates 3, as shown in FIG. 5b. As a result, the profile rail 5 can be mounted safely to the roof plate 3 as shown in FIGS. 4 and 10. The securing section 30 is preferably folded 90 degrees the end of the support section 11, as illustrated in FIG. 5a. In a preferred embodiment, both the module receptacle 6 and the roof plate receptacle 8 can form a spring clamp in order to interconnect several components of the solar roof plate system 100. From the top view shown in FIG. 5b it can be further seen that in the displayed exemplary embodiment, the number of module receptacles 6 corresponds to the number of roof plate receptacles 8.

In FIGS. 1 to 3 it is shown that the number of the roof plates 3 corresponds to the number of roof plate receptacles 8 and/or to the number of module receptacles 6. Accordingly, in the displayed exemplary embodiment of FIG. 1, four of the roof plates 3 and four of the roof plate receptacles 8 are provided for the dimension of the solar module 4. In an alternative embodiment the solar roof plate system 100 may be configured to provide that a roof plate receptacle 8, shown in FIGS. 6 and 7, extends at least partially along the length of the profile rail 5 and this single roof plate receptacle 8 clasps several, for example, two of the roof plates 3 of the solar roof plate system 100. Accordingly, in another exemplary embodiment of FIG. 10, four solar modules 4 are arranged on sixteen roof plates 3 and a plurality of the roof plate receptacles 8 are provided and configured as needed for the dimension of the solar module 4 so as to clamp to the clamping section 10 so as to cover and profile the forward edge of the roof plates 3.

As shown in of FIGS. 1-4, and 6, for additional or supplementary securing of the solar module 4 to the roof plates 3, a plurality of clamps 13 are provided, which are arranged on a side of the solar module 4 spaced apart from the profile rail 5. As shown from FIGS. 2 and 6 the clamps 13 are secured in a clamp receptacle 15 of the roof plate 3 and comprise a roof plate section 16, a module section 17 and a wall section 18 connecting the two plate and module sections 16, 17. In order to simplify the installation assembly of the overall solar roof plate system 100, the roof plate section 16 is secured in the clamp receptacle 15 by means of a press connection. As shown from FIGS. 4 and 6, according to a preferred exemplary embodiment, the clamp 13 is formed in cross-section in a z-shape. As illustrated in FIG. 2 the press connection or clamping connection is formed by two clamping lugs 31 on the clamps 13, whereby the clamp 13 comprises a recess 32 on its roof plate section 16, as a result of which the two elastic, flexible clamping lugs 31 are formed.

Figure 8:
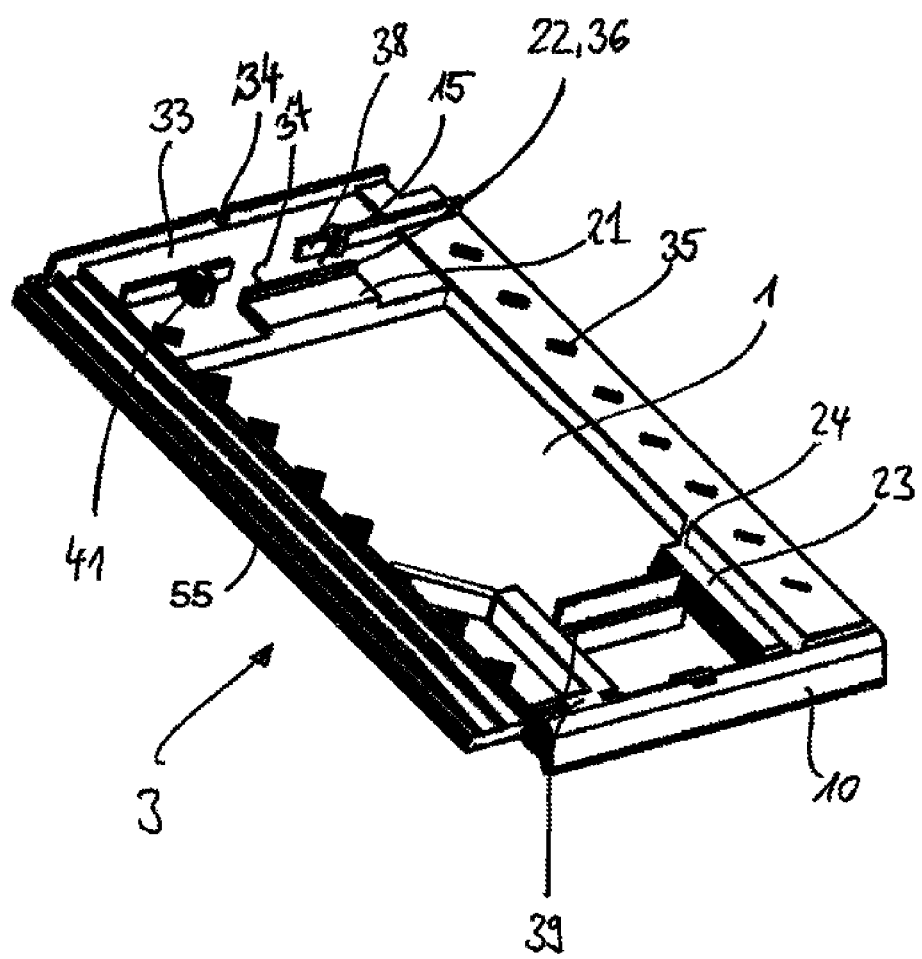
FIG. 8 a top view of a roof plate (or a base body) for use with the solar roof plate system according to FIG. 1.
Figure 9:
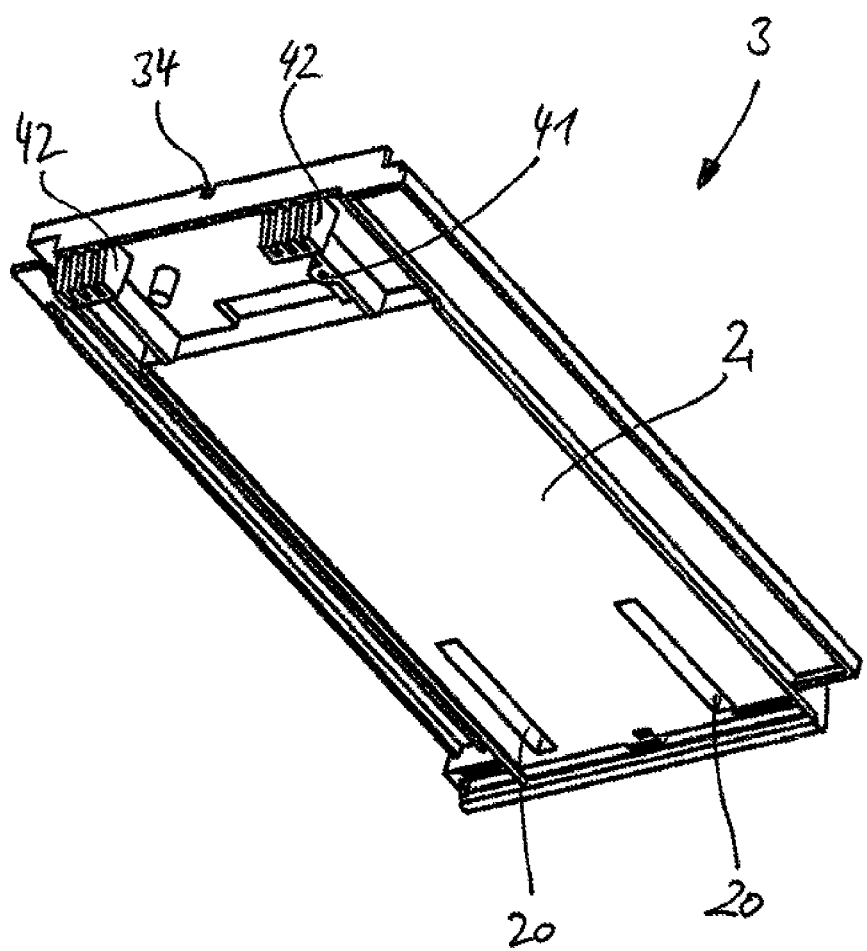
FIG. 9 a bottom view of the solar roof plate according to FIG. 8.

Referring to FIGS. 8 and 9, the structure of the roof plates 3 of the solar roof plate system 100 is explained in more detail. The roof plates 3 are preferably formed from a good heat conducting material, such as a plastic, a polymer concrete or glass. It is particularly preferred, however, that the roof plates 3 are formed entirely or partially from a polypropylene (PP)/Polyethylene (PE) with mineral filler.

For guiding the connecting cables 25, as is illustrated in FIGS. 3 and 8, the roof plate 3 has a cable guide 33 or a cable channel, which is arranged essentially parallel to the roof lathing, the roof ridge or the eave. Furthermore, as is illustrated in FIGS. 1-4 and 8-9, the roof plate 3 has a cable passage 34 for the long-sided feedthrough of connecting cables 25.

Referring to FIG. 8, each base body or roof plate 3 comprises an upper side 1 and a lower side 2 of the roof plate 3 (shown in FIG. 9) according to the invention, wherein a support block 21 and a support structure 23 for supporting a solar module 4 are formed on the upper side 1. Furthermore, the roof plate 3 has support elements or cams 35 for the solar module 4, which are formed, if necessary, from a material increasing the friction so that a placed solar module 4 cannot slip from the roof plate 3. The support structure 23 furthermore comprises guide struts 24, preferably arranged in a funnel shape, through which incoming water can be discharged. Furthermore, air can be guided particularly well by this support structure 23, so that heat accumulations are avoided. The support block 21 also provides a stop member 22 and/or an extending stop wall 36, to which the solar module 4 can be placed before the profile rail 5 is fixed in a clamping manner on the edge 7 of the solar module 4, as shown in FIGS. 3-4, 7 and 10, which faces the eave, and the clamping section 10 of the roof plate 3. Furthermore, as is illustrated in FIGS. 4, 6 and 8, the clamp receptacle 15 can be seen, which in the displayed exemplary embodiment is formed by the wall 37 of the stop member 22 and a roof plate wall section 38.

Furthermore, as is illustrated in FIGS. 2, 3, 6, 7 and 8, the roof plate 3 has a bushing 39 with a guide sleeve so that a securing pin 40 can be driven into this bushing 39 in order to additionally interconnect two adjacent roof plates 3 by means of the securing pin 40, as shown in FIG. 7. The roof plate 3 also has a passage 41, through which the roof plate 3 can be coupled, preferably screwed, to the roof lathing. This passage 41 can at the same time also be embodied as a threaded bushing 39 by way of which at least one of the guide members 19 can be coupled or screwed to the roof plates 3 as is illustrated in FIGS. 1-3, and 7-9.

FIG. 9 shows a bottom view of the lower side 2 of the roof plate 3, wherein the roof plate 3 in the displayed exemplary embodiment has at least one, and preferably two, guide receptacles 20 for receiving a guide member 19. Furthermore, feet 42 are provided for hanging the roof plates 3 into a roof lathing, as shown in FIGS. 6 and 9.

It can be seen from FIGS. 8 and 9 that the roof plate 3 is formed as a grooved tile for installation on the roof structure. In the displayed exemplary embodiment, the roof plate 3 is to be installed in a left covering, that is to say from right to left, with the edge portion 55 mounted on overlapping existing regular roof plates, saddle stones or roof tiles.

In the following, as is illustrated in FIG. 1, the assembly of the solar roof plate system 100 is explained. For this purpose, four solar modules 4 are disposed on sixteen of the roof plates 3 are first coupled to one another in left covering and are interconnected if necessary with securing pins 40. The profile rail 5 is pressed onto the side of the roof plates 3 facing away from the roof ridge so that the roof plate receptacles 8 firmly surround the clamping sections 10 of the roof plates 3. Now, the connection block 27 can be mounted on the upper side 1 of one of the roof plates 3, after which the solar module 4 is subsequently inserted into the module receptacles 6 of the profile rail 5. On its side facing away from the profile rail 5, the weight of the solar module 4 bears on the support block 21 and abuts the stop wall 36 of the roof plates 3, as shown in FIGS. 2, 3 and 8. For additional securing of the solar module 4, the clamps 13 are now pressed into the clamp receptacles 15, after which the module sections 17 of the clamps 13 additionally secure the solar module 4 to the roof plate 3 as shown in FIG. 7. In addition, the connecting cables 25 are laid along the cable guides 33 and are coupled to the adjacent solar modules 4 in the solar roof plate system 100. For a secure connection, the connecting cables 25 are coupled to each other by means of screw connections as well as the roof plates 3 can be fastened by means of screw fasteners 44, as shown in FIG. 3. According to an alternative embodiment, a bayonet closure is provided here. Finally, the guide members 19 are attached to the individual roof plates 3, shown in FIG. 3, which can be inserted into the guide receptacles 20 of next higher-lying solar roof plates 3, i.e. which are arranged in the direction of the ridge of the roof.

In FIG. 10 an arrangement of several solar roof plate systems 100 is shown, whereby the connection cables 25 and cable guides 33 are covered by the solar roof plate systems 100 located above, and the connection cables 25 and cable guides 33 are thus protected from weather conditions. Furthermore, a covering element 43, preferably in the form of a seal, is provided, e.g. in the form of a rubber seal, by means of which the solar roof plate system 100 is additionally sealed. With the solar roof plate systems 100 according to the invention, an arrangement results in a double-tier roof covering. In the case of a corresponding form of a solar module 4, it is also possible to provide a triple-tier or multiple-tier covering, in which case the solar cells 26 of the solar module 4 should not be covered by next higher-lying roof plate 3 of the solar roof plate systems 100.

On the left-hand side and/or on the right-hand side of the solar roof plate systems 100, a cover plate can additionally be provided, so that no liquid enters laterally under the solar modules 4 and that, in addition, protection from flying sparks is provided. Thereby, this cover plate can comprise one or more ventilation passages for ventilating and/or cooling the solar modules 4 on their side facing the roof plates 3.

It is particularly advantageous in the solar roof plate system 100 according to the present invention that all installation and cabling works take place above the roof laths and the rafters and thus no passage through the roofing is required. In the case of a repair or a revision, the solar module 4 can be removed very easily from the roof plates 3 without having to loosen, if necessary, even screwed roof plates 3 from the roof lathing. Due to the roof-integrated technology, also the architectural impression of the building is better preserved. The system can be integrated as desired into already existing (e.g. already covered) roofs and can thus be retrofitted.

Throughout the detailed description of the solar roof plate system 100, the element reference signs are as follows:

1 upper side
2 lower side
3 roof plate
4 solar module
5 profile rail
6 module receptacle
7 edge (facing the profile rail)
8 roof plate receptacle
9 profile clamp
10 clamp section
11 support section
12 bracket section
13 clamp
14 edge (remote from the profile rail)
15 clamp receptacle
16 roof plate section
17 module section
18 wall section
19 guide member
20 guide receptacle
21 support block
22 stop member
23 support structure
24 guide struts
25 connecting cables
26 solar cells
27 connection block
28 recess
29 base strut
30 securing section
31 clamping lug
32 recess
33 cable guide
34 cable passage
35 support element
36 stop web
37 wall
38 roof plate wall section
39 bushing
40 securing pin
41 passage
42 foot
43 covering element 61-63 profile clamp fold
81-83 receptacle fold and edge fold 84

While certain configurations of structures have been illustrated for the purposes of presenting the basic structures of the present invention, one of ordinary skill in the art will appreciate that other variations are possible which would still fall within the scope of the appended claims. Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A solar roof plate system for installing on an inclined surface of a roof having a ridge and/or an eave, comprising:
    two or more roof plates, each of said roof plates comprising an upper side and a lower side, said upper side of each of said roof plates capable of receiving a solar module extending over said upper side so as to fasten said solar module to said upper side; and
    a profile rail capable of interconnecting said two or more roof plates, said profile rail comprises at least one roof plate receptacle for receiving at least one of said two or more roof plates, said at least one roof plate receptacle comprises a profile clamp and at least one of said two or more roof plates comprises a clamp section capable of being gripped by said profile clamp, and said profile rail comprises at least one of a module receptacle for receiving an edge of said solar module facing the ridge and/or the eave of the roof.

2. The solar roof plate system of claim 1, wherein a number of said roof plate receptacle is provided corresponding to a number of each of said roof plates.

3. The solar roof plate system of claim 1, wherein said profile clamp is provided for securing an edge of said solar module.

4. The solar roof plate system according to claim 3, further comprising a clamp receptacle arranged on said upper side on at least one of said roof plates, said profile clamp configured to be received in said clamp receptacle for securing said profile clamp to at least one of said roof plates.

5. The solar roof plate system of claim 4, wherein said clamp comprises a roof plate section secured in said clamp receptacle and a module section interacting with said solar module.

6. The solar roof plate system of claim 5, wherein said roof plate section is secured in said clamp receptacle by means of a press connection.

7. The solar roof plate system of claim 6, wherein said clamp is configured with a cross section in a z-shape and/or in steps having a wall section connecting said roof plate section and said module section.

8. The solar roof plate system according to claim 1, wherein said roof plate further comprises a support block arranged on said upper side for supporting said solar module, a stop member arranged on the said support block for aligning the said solar module and a support structure comprising guide struts.

9. A solar roof plate system for installing on an inclined surface of a roof having a ridge and/or an eave, comprising:
    two or more roof plates, each of said roof plates comprising an upper side and a lower side, said upper side of each of said roof plates capable of receiving a solar module extending over said upper side so as to fasten said solar module to said upper side; and
    a profile rail capable of interconnecting said two or more roof plates, said profile rail comprises at least one roof plate receptacle for receiving at least one of said two or more roof plates, said profile rail comprises at least one of a module receptacle having a support section and a bracket section, said at least one module receptacle capable of receiving an edge of said solar module facing the ridge and/or the eave of the roof, and, wherein said support section of said module receptacle is formed in one piece with a profile clamp.

10. A solar roof plate system for installing on an inclined surface of a roof having a ridge and/or an eave, comprising:
    two or more roof plates, each of said roof plates comprising an upper side and a lower side, said upper side of each of said roof plates capable of receiving a solar module extending over said upper side so as to fasten said solar module to said upper side, wherein at least one of said roof plates has at least one of a guide member on an area not covered by said solar module; and
    a profile rail capable of interconnecting said two or more roof plates, said profile rail comprises at least one of a module receptacle for receiving an edge of said solar module facing the ridge and/or the eave of the roof, said roof plate has at least one of a guide member on an area not covered by said solar module, wherein said roof plate has at least one of a guide receptacle on said lower side for receiving said guide member of a next lower-lying of said roof plate.

11. A solar roof plate system for installing on an inclined surface of a roof having a ridge and/or an eave, comprising:
    two or more roof plates, each of said roof plates comprising an upper side and a lower side, said upper side of each of said roof plates capable of receiving a solar module extending over said upper side so as to fasten said solar module to said upper side, wherein at least one of said roof plates has at least one of a guide member on an area not covered by said solar module;
    a profile rail capable of interconnecting said two or more roof plates, said profile rail comprises at least one of a module receptacle for receiving an edge of said solar module facing the ridge and/or the eave of the roof, and
    a roof plate receptacle comprising a profile clamp with a plurality of receptacle folds, whereby said profile rail is configured to receive said edge of said solar module for connecting at least two of said roof plates with said module receptacle of a bracket section and a support section.

12. A solar roof plate system for installing on an inclined surface having a ridge and/or an eave, comprising:
    a roof plate, said roof plate comprising an upper side and a lower side,
    a solar module configured to extend over at least two of said roof plates operably interconnected with each other, said solar module arranged on said upper side of each of said roof plates and configured to be fastened to said at least two of said roof plates;
    a profile rail configured for interconnecting each of said at least two roof plates, whereby said profile rail comprises at least one of a module receptacle for receiving an edge of said solar module facing the ridge and/or the eave;
    at least one clamp is provided for securing said edge of said solar module to said roof plate, and
    at least one of a clamp receptacle arranged on said upper side on at least one of said at least two of said roof plates, said clamp configured to be received in said clamp receptacle for securing said clamp to at least one of said roof plates.

13. The solar roof plate system of claim 12, wherein said clamp comprises a roof plate section secured in said clamp receptacle and a module section interacting with said solar module.

14. The solar roof plate system of claim 13, wherein said roof plate section is secured in said clamp receptacle by means of a press connection.

15. The solar roof plate system of claim 14, wherein said clamp is configured with a cross section in z-shape or in steps having a wall section connecting said roof plate section and said module section.

* * * * *